No. 733,314. PATENTED JULY 7, 1903.
A. DANIELS.
DUSTLESS ASH SIFTING MACHINE.
APPLICATION FILED SEPT. 13, 1902.
NO MODEL.
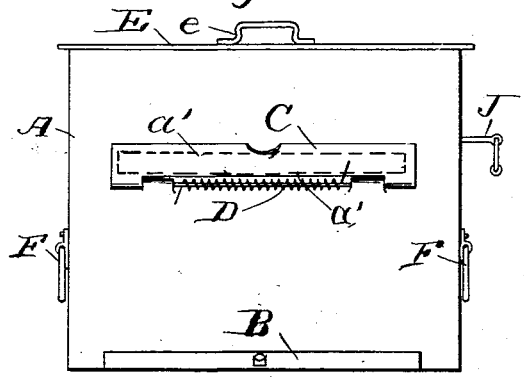
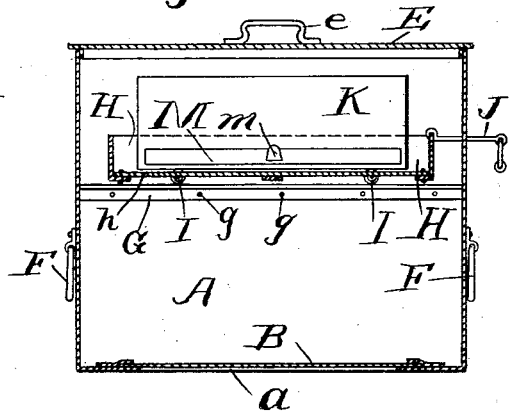
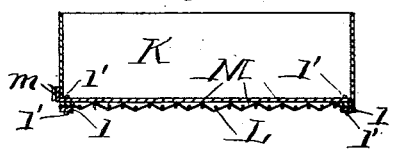
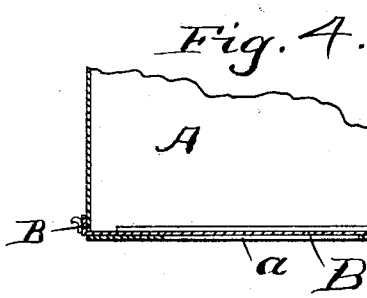
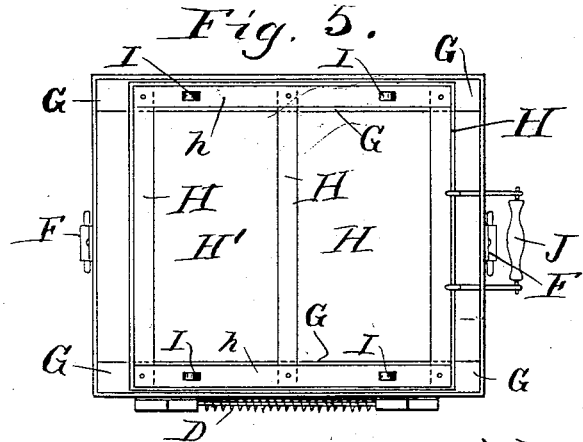
Witnesses:
G. S. Noble
Elise Daniels
Inventor,
August Daniels,
By Charles Pivner Brown,
Att'y No. 733,314. Patented July 7, 1903.

UNITED STATES PATENT OFFICE.

AUGUST DANIELS, OF CHICAGO, ILLINOIS.

DUSTLESS ASH-SIFTING MACHINE.

SPECIFICATION forming part of Letters Patent No. 733,314, dated July 7, 1903.

Application filed September 13, 1902. Serial No. 123,211. (No model.)

*To all whom it may concern:*

Be it known that I, AUGUST DANIELS, a citizen of the United States, and a resident of Chicago, in the county of Cook and State of Illinois, have invented certain new and useful Improvements in Dustless Ash-Sifting Machines, of which the following, when taken in connection with the drawings accompanying and forming a part hereof, is a full and complete description, sufficient to enable those skilled in the art to which it pertains to understand, make, and use the same.

The object of this invention is to obtain an ash-sifting machine of the kind named into which ashes may be transferred from the ash-box of a stove without removal thereof from the ash-pan of the stove—that is, the ash-pan, together with its contents, may be removed from the stove directly to the ash-sifting machine; and a further object of the invention is to obtain an ash-sifter of the kind named by means of which the movement of the ash-receptacle of the apparatus is more rapid than is the movement of the wagon in which the ash-receptacle is placed, and the blow or shock to such ash-receptacle at the end of its movement in either direction is made thereby greater than in ash-sifting machines wherein the movement of the wagon and ash-receptacle is substantially at the same rate of speed.

In the drawings referred to as accompanying this specification, Figure 1 is a front elevation. Fig. 2 is a vertical sectional view in a plane parallel with the front of the machine.
Fig. 3 is a vertical sectional view at right angles to Fig. 2 of the ash-pan of the machine. Fig. 4 is a vertical sectional view of the lower part of the casing of the machine at right angles to Fig. 2, and Fig. 5 is a top plan view of the machine with the cover and ash-pan thereof removed therefrom.

A reference-letter applied to designate a given part is used to indicate such part throughout the several figures of the drawings wherever the same appears.

A is a receptacle provided with aperture $a$ in the bottom thereof and with aperture $a'$ (indicated by dotted lines in Fig. 1) in one of the side walls thereof.
B is a slide covering the aperture $a$ in the bottom of the receptacle A, and C is a hinged flap covering the aperture $a'$ in the side wall of receptacle A.

D is a spring yieldingly holding flap C against the side wall of the receptacle to close the aperture $a'$.

E is a removable cover to receptacle A, and $e$ is the handle of cover E.

F F are handles to receptacle A.

G G are ledges in receptacle A, such ledges being secured in place, as by rivets $a$ $a$.

H is a wagon provided with rollers I I and with a handle J.

H' is an aperture in the bottom $h$ of wagon H.

The rollers I I respectively extend through the bottom $h$ of the wagon H, as is shown in Figs. 2 and 5, so that the ash pan and sifter K may rest on such rollers, as shown in Fig. 2. By this means when this wagon H is moved to and fro by means of handle J there is a tendency to move the ash pan and sifter K twice the distance such wagon H moves. By having the ash pan and sifter K considerably smaller than the wagon H, as shown in Fig. 2 of the drawings, more movement is obtained therein than in such wagon when the wagon is agitated by means of handle J.

L, Fig. 3, is the sieve-bottom to the ash pan and sifter K. Such sieve L may be secured in place by strips $l$ $l$ and rivets $l'$. (See Fig. 3.)

M is a slide-bottom to the ash pan and sifter K, and $m$ is the handle by means of which the slide M is removed. Slide M registers with aperture $a'$ in receptacle A when the ash pan and sifter K is placed in wagon H, as illustrated in Fig. 2, so that by opening the flap C (see Fig. 1) from the aperture $a'$, as by turning such flap on its hinges against the resilience of the spring D, the slide M may be withdrawn from such ash pan and sifter K through such aperture $a'$.

The operation of this apparatus is as follows: Ash pan and sifter K is made to fit into the hearth of a stove as a substitute for the ash-pan ordinarily contained in the stove, (with the slide M in the ash pan and sifter over the sieve L,) and when coal and ashes are contained in such ash pan and sifter it is removed from the stove and placed in the wagon H of this apparatus, cover E being first removed. Cover E is then replaced, flap C removed from over aperture $a'$, and slide M is withdrawn from the ash pan and sifter K and from the apparatus, so that the flap C may close such aperture $a'$. The wagon H is then agitated by means of the handle J, thus agitating ash pan and sifter K, thereby causing the ashes contained therein to pass through the sieve and fall through the opening H' in the bottom $h$ of wagon H into the receptacle A. The coal and other articles in the ash pan and sifter which are too large to pass through the sieve L will remain in such ash pan and sifter. The sifting of the ashes, as above described, may be done in the room or chamber in which the stove is placed, as no dust is caused either by transferring the ash pan and sifter from the stove into the wagon of the apparatus or in the sifting of the contents of such ash pan and sifter while it is in the apparatus, as hereinbefore described. When the contents of the ash pan and sifter have been sifted and a sufficient time has elapsed for the ash-dust in receptacle A to settle, the ash pan and sifter may be removed therefrom and its contents removed from such ash pan and sifter, after which the slide M may be returned to its place above the sieve L and the ash pan and sifter again put in the hearth of a stove underneath the grate thereof. When it is desired to empty therefrom the ashes contained in receptacle A, such receptacle may be placed over a barrel or other thing and the slide B removed, when such ashes will fall into such receptacle.

By the hereinbefore-described apparatus ashes and coal in the ash-pan underneath the grate of a stove may be taken from the stove and separated from each other, the coal returned to the stove, and the ashes deposited in a barrel without the production of any considerable quantity of ash-dust.

Having thus described my invention, what I claim as new, and desire to secure by Letters Patent, is—

1. In a dustless ash-sifting machine, a receptacle provided with a cover and an open bottom, a slide to cover the aperture in the bottom, ledges midway of the top and bottom of the receptacle, a movable wagon provided with an aperture in the bottom thereof, rollers on the wagon resting on the ledges, such rollers extending through the bottom of the wagon, a handle to the wagon extending through one of the walls of the receptacle, an ash-sifter smaller than the wagon and fitting loosely therein over the aperture in the bottom thereof to rest on the top of the rollers on the wagon; substantially as described.

2. In a dustless ash-sifting machine, a receptacle provided with a cover, an aperture in one of the side walls and an open bottom, a slide to cover the aperture in such bottom, and a cover to the aperture in the side, ledges midway of the top and bottom of the receptacle, a movable wagon provided with an aperture through the bottom thereof, rollers on the wagon resting on the ledges, such rollers extending through the bottom of the wagon, a handle to the wagon extending through one of the walls of the receptacle, an ash-sifter comprising side walls, a sieve-bottom and a slide-bottom about the sieve-bottom, such ash-sifter smaller than the wagon and fitting therein over the aperture in the bottom of the wagon to rest on the top of the rollers on the wagon, with the slide of the ash-sifter registering with the aperture in the side wall of the first-named receptacle; substantially as described.

3. An ash pan and sifter consisting of side walls, a sieve-bottom and a slide-bottom above the sieve-bottom, with one of the side walls provided with an aperture therethrough through which the slide-bottom may be removed from over the sieve-bottom, in combination with a receptacle into which the ash-pan may be placed, such receptacle provided with a cover and with an aperture in one of the side walls thereof registering with the slide in the ash pan and sifter when such ash pan and sifter is placed therein, and means to agitate the ash pan and sifter in the receptacle when the cover of the receptacle is on; substantially as described.

AUGUST DANIELS.

In presence of—
A. H. DETL,
ELIRE DANIELS.